(12) United States Patent
Cao et al.

(10) Patent No.: US 12,534,771 B2
(45) Date of Patent: Jan. 27, 2026

(54) HIGH-CARBON BEARING STEEL AND PREPARATION METHOD THEREOF

(71) Applicant: CENTRAL IRON & STEEL RESEARCH INSTITUTE, Beijing (CN)

(72) Inventors: Wenquan Cao, Beijing (CN); Yuqing Weng, Beijing (CN); Haifeng Xu, Beijing (CN); Cunyu Wang, Beijing (CN); Feng Yu, Beijing (CN); Hui Wang, Beijing (CN); Zhiyue Shi, Beijing (CN); Da Xu, Beijing (CN)

(73) Assignee: CENTRAL IRON & STEEL RESEARCH INSTITUTE, Beijing (CN)

( * ) Notice: Subject to any disclaimer, the term of this patent is extended or adjusted under 35 U.S.C. 154(b) by 86 days.

(21) Appl. No.: 17/185,662

(22) Filed: Feb. 25, 2021

(65) Prior Publication Data
US 2021/0371944 A1 Dec. 2, 2021

(30) Foreign Application Priority Data
Jun. 2, 2020 (CN) .......................... 202010489419.3

(51) Int. Cl.
*C21D 6/00* (2006.01)
*C21D 1/18* (2006.01)
(Continued)

(52) U.S. Cl.
CPC ............... *C21D 6/008* (2013.01); *C21D 1/18* (2013.01); *C21D 1/32* (2013.01); *C21D 6/005* (2013.01);
(Continued)

(58) Field of Classification Search
CPC . C21D 6/008; C21D 1/18; C21D 1/32; C21D 6/005; C22C 33/04; C22C 38/002;
(Continued)

(56) References Cited

U.S. PATENT DOCUMENTS

| 3,341,321 A | * | 9/1967 | Morrison | ................. C22B 4/00 29/527.6 |
| 2005/0279431 A1 | * | 12/2005 | Daito | ...................... C22C 38/18 420/104 |

(Continued)

FOREIGN PATENT DOCUMENTS

| EP | 1158064 | * | 11/2001 |
| JP | 07216508 A | * | 8/1995 |

(Continued)

*Primary Examiner* — Nicholas A Wang
(74) *Attorney, Agent, or Firm* — Corinne Marie Pouliquen; Calderon Safran & Wright PC

(57) ABSTRACT

The invention relates to the technical field of microstructure refinement and homogenization of bearing steel, and specifically relates to a high-carbon bearing steel and a method of preparing same. The high-carbon bearing steel of the invention has the following chemical composition: C: 0.80~1.20 wt %, Cr: 0.40~2.0 wt %, Mn: 0.15~0.75 wt %, Si: 0.15~0.75 wt %, Nb: 0~0.20 wt %, Mo: 0~0.20 wt %, V: 0~0.20 wt %, P≤0.015 wt %, S≤0.01 wt %, the remaining is Fe and unavoidable impurities; the contents of Nb, Mo and V are not 0 at the same time. According to the invention, microalloying elements such as Nb, Mo and V, in combination with other elements, are added into the high-carbon bearing steel to effectively refine the bearing steel matrix and promote the precipitation of a large amount of nano-carbides, thereby enhancing the contact fatigue life of the high-carbon bearing steel.

8 Claims, 1 Drawing Sheet

(51) Int. Cl.
*C21D 1/32* (2006.01)
*C22C 33/04* (2006.01)
*C22C 38/00* (2006.01)
*C22C 38/02* (2006.01)
*C22C 38/04* (2006.01)
*C22C 38/22* (2006.01)
*C22C 38/24* (2006.01)
*C22C 38/26* (2006.01)

(52) U.S. Cl.
CPC ............ *C22C 33/04* (2013.01); *C22C 38/002* (2013.01); *C22C 38/02* (2013.01); *C22C 38/04* (2013.01); *C22C 38/22* (2013.01); *C22C 38/24* (2013.01); *C22C 38/26* (2013.01)

(58) Field of Classification Search
CPC ......... C22C 38/02; C22C 38/04; C22C 38/22; C22C 38/24; C22C 38/26; F16C 2204/66
See application file for complete search history.

(56) References Cited

U.S. PATENT DOCUMENTS

| | | | |
|---|---|---|---|
| 2010/0037976 A1* | 2/2010 | Toyotake | C22C 38/34 72/202 |
| 2011/0052442 A1* | 3/2011 | Sherif | C22C 38/22 420/104 |
| 2014/0099228 A1* | 4/2014 | Kaizuka | C22C 38/42 420/104 |
| 2017/0335440 A1* | 11/2017 | Sherif | C22C 38/46 |

FOREIGN PATENT DOCUMENTS

| | | | |
|---|---|---|---|
| JP | 2001234277 A | * | 8/2001 |
| JP | 3279230 B2 | * | 4/2002 |
| JP | 3633129 B2 | * | 3/2005 |
| JP | 4593510 B2 | * | 12/2010 |

* cited by examiner

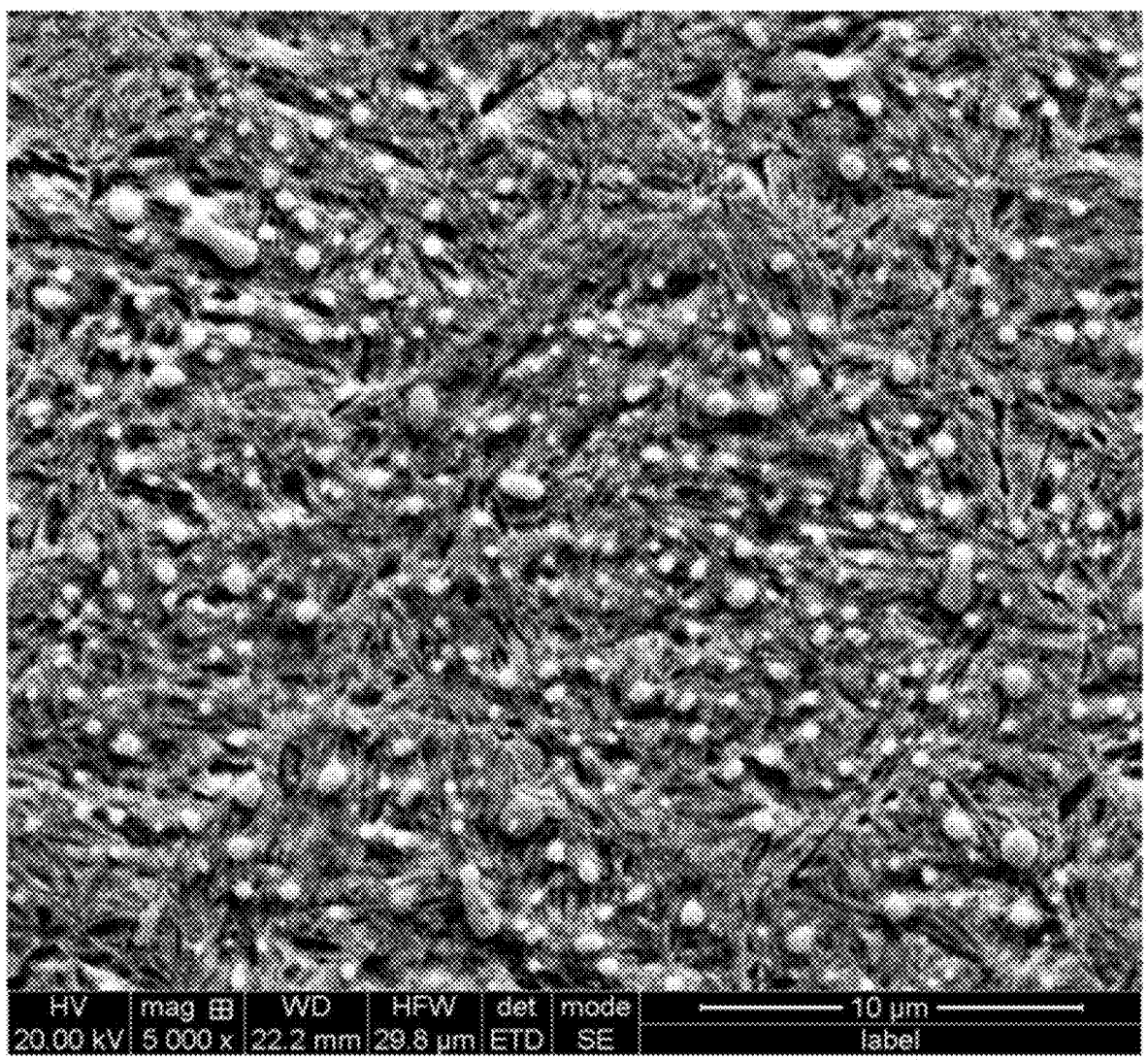

HIGH-CARBON BEARING STEEL AND PREPARATION METHOD THEREOF

CROSS-REFERENCE TO RELATED APPLICATIONS AND CLAIM TO PRIORITY

This application is related to Patent Application No. 202010489419.3 filed Jun. 2, 2020 in China, the entire disclosure of which is incorporated herein by reference and to which priority is claimed.

FIELD OF THE INVENTION

The invention relates to the field of microstructure refinement and homogenization of bearing steel, and specifically relates to a high-carbon bearing steel and a method of preparing same.

BACKGROUND OF THE INVENTION

Bearings are an essential part of all transmissions, the fatigue life of which determines the service life and reliability of the machine and equipment. At present, civilian bearing steels such as high-carbon chromium bearing steel with thorough hardenability (e.g., GCr15, GCr15SiMn, GCr15SiMo and GCr18Mo) and stainless bearing steel (e.g., 9Cr18Mo), as well as military bearing steel (e.g., 8Cr4Mo4V) are widely used worldwide. Aerospace, mining machinery, transportation, marine ships, and other high-end equipment applications all require long life and high reliability bearings. However, the contact fatigue life of the bearing steel used for making bearings, especially high-carbon bearing steel with thorough hardenability is generally low, which does not satisfy the requirements of long service life and high reliability for high-end equipment.

To improve the fatigue life of bearing steel, a lot of research on improving the contact fatigue life of bearing steel has been carried out, which mainly reduces the content of inclusions contained in the bearing steel, decreases the size of inclusions in the bearing steel, and controls the types and distribution of inclusions in the bearing steel. Under the guidance of this theory, by reducing the oxygen content in the bearing steel from 30~50 ppm to the current 3~5 ppm, the contact fatigue life of the commercial bearing steel GCr15 has improved from $L_{10} \geq 10^5$ times for steel smelted in the atmosphere in the 1950s to $L_{10} \geq 10^7$ times for steel refined out of furnace in the 1990s. Further, after nearly 30 years of cross-century development, at present, the fatigue life of the high-carbon bearing steel GCr15 refined out of furnace has been plateaued at $L_{10} \geq 1\text{~}2 \times 10^7$ times, and there has been no further progress, so the requirements of long life and high reliability for high-end equipment has not been met. Therefore, using an out-of-furnace refining process to further reduce the oxygen content and decrease the size and content of inclusions not only greatly increases the cost and reduces the production efficiency, but the contact fatigue life is not greatly enhanced. Therefore, high-end bearings used in railway, shield, machine tools and the like require Electro-slag Remelting (ESR) GCr15 ($L_{10} \geq 3.0 \times 10^7$ times) and double vacuum (Vacuum Induction Melting (VIM)+Vacuum Arc Remelting (VAR)) GCr15 ($L_{10} \geq 4.5 \times 10^7$ times), which are expensive processes but provide long contact fatigue life. However, for the production and sales volume of more than 10 million tons of bearing steel, ESR bearing steel and VIM+VAR bearing steel cannot meet the production requirements, and furthermore, the cost is greatly increased (2 to 4 times higher than the cost of bearing steel refined out of furnace, respectively).

Further research has shown that the contact fatigue life of bearing steel is not only affected by the inclusions, but is also dependent on the thickness of the bearing steel matrix, the size and distribution of carbides and the content of residual austenite in the steel. Studies have shown that the grain size of the bearing steel GCr15 and carbides can be refined in one integral step of double refinement and heat treatment, thereby enhancing the fatigue life of bearing steel by more than 5 times. The content of austenite on the surface of bearing steel can be increased by 15~30% by surface hardening heat treatment, thereby enhancing the contact fatigue life of bearing steel by 5~10 times. The surface of bearing steel GCr15 is carburized to enhance the hardness of the bearing steel surface and control the carbides, thus enhancing the contact fatigue life of bearing steel by over 10 times. However, the above heat treatments not only increase the manufacturing difficulty of the bearings and reduce the accuracy of the bearings, but also greatly increase the manufacturing cost of the bearings.

SUMMARY OF THE INVENTION

The invention provides a high-carbon bearing steel and a method of making same, in which no special heat treatment is required and microalloying elements are only utilized to enhance the anti-fatigue life of high-carbon bearing steel, thus meeting the extensive performance requirements of long life, high reliability and low cost for bearing steel used in high-end equipment.

To realize the above purpose, the invention provides the following technical solutions:

The invention provides a high-carbon bearing steel, the chemical composition of which is: C: 0.80~1.20 wt %, Cr: 0.40~2.0 wt %, Mn: 0.15~0.75 wt %, Si: 0.15~0.75 wt %, Nb: 0~0.20 wt %, Mo: 0~0.20 wt %, V: 0~0.20 wt %, P≤0.015 wt %, S≤0.01 wt %, the remaining is Fe and unavoidable impurities; where the bearing steel comprises at least one of Nb, Mo and V.

Preferably, the high-carbon bearing steel comprises at least two of Nb, Mo and V.

Preferably, the total quantity of Nb, Mo and V is about 0.10~0.30 wt %.

The invention also provides a method of preparing the high-carbon bearing steel described herein, comprising the following steps:

The preparation comprises smelting the raw materials of the high-carbon bearing steel to get steel ingots, wherein the steel ingots have a chemical composition corresponding to the chemical composition of the high-carbon bearing steel in the above composition.

The steel ingots are homogenized and then processed into bars.

The bars are successively subject to spheroidizing annealing, quenching, and tempering to obtain the high-carbon bearing steel.

Preferably, the smelting comprises electro-slag remelting (ESR), double vacuum melting (VIM+VAR), out-of-furnace refining or vacuum induction melting.

Preferably, the temperature for homogenization is about 1100~1250° C., and the holding time is about 2~6 hours.

Preferably, the process of spheroidizing annealing comprises the steps of holding the bars at about 800~860° C. for about 0.5~12 hours, then cooling down to about 680~740° C. and holding for about 0.5~12 hours, and finally cooling in air to room temperature.

Preferably, the temperature for quenching is about 820~860° C., the holding time is about 0.10~1.0 hours, and the cooling for quenching is oil quenching.

Preferably, the temperature for tempering is about 130~200° C., the holding time is 0.5~3.5 hour, and the cooling for tempering is air cooling.

Preferably, the bars are processed by hot forging or hot rolling, and the temperature for hot forging or hot rolling is about 1150~1200° C.

The invention provides a high-carbon bearing steel, the chemical composition of which is: C: 0.80~1.20 wt %, Cr: 0.40~2.0 wt %, Mn: 0.15~0.75 wt %, Si: 0.15~0.75 wt %, Nb: 0~0.20 wt %, Mo: 0~0.20 wt %, V: 0~0.20 wt %, P≤0.015 wt %, S≤0.01 wt %, the remaining is Fe and unavoidable impurities; wherein the bearing comprises at least one of Nb, Mo and V. According to the invention, microalloying elements such as Nb, Mo and V, in combination with other elements, are added into the high-carbon bearing steel to effectively refine the bearing steel matrix, refine the carbides in the bearing steel, and promote the precipitation of a large amount of nano-carbides, thereby enhancing the mechanical properties and the contact fatigue life of the high-carbon bearing steel. Results have shown that the fatigue life of the bearing steel containing Nb, Mo and V in the invention has been enhanced by 3~14 times compared to the bearing steel without microalloying elements.

BRIEF DESCRIPTION OF THE DRAWING

The drawing shows an SEM diagram of steel MA5 smelted in the laboratory after tempering.

DETAILED DESCRIPTION OF THE PREFERRED EMBODIMENT(S)

The invention provides a high-carbon bearing steel, the chemical composition comprising C: 0.80~1.20 wt %, Cr: 0.40~2.0 wt %, Mn: 0.15~0.75 wt %, Si: 0.15~0.75 wt %, Nb: 0~0.20 wt %, Mo: 0~0.20 wt %, V: 0~0.20 wt %, P≤0.015 wt %, S≤0.01 wt %, the remaining is Fe and unavoidable impurities, wherein the composition comprises at least one of Nb, Mo and V.

The high-carbon bearing steel of the invention comprising C: 0.80~1.20 wt %, preferably 0.9~1.1 wt %, and more preferably 0.95~1.05 wt %.

The high-carbon bearing steel of the invention comprising Cr: 0.40~2.0 wt %, preferably 0.5~1.8 wt %, and more preferably 1.0~1.6 wt %.

The high-carbon bearing steel of the invention comprising Mn: 0.15~0.75 wt %, preferably 0.20~0.60 wt %, and more preferably 0.3~0.5 wt %.

The high-carbon bearing steel of the invention comprising Si: 0.15~0.75 wt %, preferably 0.20~0.70 wt %, and more preferably 0.30~0.60 wt %.

The high-carbon bearing steel of the invention comprising P≤0.015 wt %, preferably 0.001~0.015 wt %.

The high-carbon bearing steel of the invention comprising S≤0.01 wt %, preferably 0.001~0.01 wt %.

The high-carbon bearing steel of the invention comprising Nb: 0~0.20 wt %, preferably 0.03~0.20 wt %, and more preferably 0.05~0.15 wt %.

The high-carbon bearing steel of the invention comprising Mo: 0~0.20 wt %, preferably 0.03~0.20 wt %, and more preferably 0.05~0.15 wt %.

The high-carbon bearing steel of the invention comprising V: 0~0.20 wt %, preferably 0.03~0.20 wt %, and more preferably 0.05~0.10 wt %.

According to the invention, the contents of Nb, Mo and V are not 0 at the same time, i.e., the high-carbon bearing steel of the invention comprises at least one of Nb, Mo and V; the invention preferably comprises at least two of Nb, Mo and V. According to the invention, the total quantity of Nb, Mo and V is preferably 0.10~0.30 wt %, more preferably 0.15~0.30 wt %, and more preferably 0.25~0.30 wt %.

According to the invention, microalloying elements such as Nb, Mo and V, in combination with other elements, are added into the high-carbon bearing steel to effectively refine the bearing steel matrix, refine the carbides in the bearing steel, and promote the precipitation of a large amount of nano-carbides, thereby enhancing the mechanical properties and the contact fatigue life of the high-carbon bearing steel.

The invention provides a method of preparing the high-carbon bearing steel in the above composition, comprising the following steps:

The preparation comprises smelting the raw materials of the high-carbon bearing steel to obtain steel ingots, wherein the steel ingots have a chemical composition corresponding to the chemical composition of the high-carbon bearing steel in the above composition.

The steel ingots are homogenized and then processed into bars.

The bars are successively subject to spheroidizing annealing, quenching, and tempering to obtain the high-carbon bearing steel.

According to the invention, preparation comprises smelting the raw materials of the high-carbon bearing steel to obtain steel ingots. According to the invention, the smelting preferably comprises electro-slag remelting (ESR), double vacuum melting (VIM+VAR), out-of-furnace refining or vacuum induction melting. The invention has no special requirement for the smelting process, any process that is well known in the art such as electro-slag remelting (ESR), double vacuum melting (VIM+VAR), out-of-furnace refining or vacuum induction melting, may be used. The smelting of the invention is suitable for a converter, an electric furnace, or an induction furnace. According to the invention, the chemical composition of the steel ingots corresponds to the chemical composition of the high-carbon bearing steel in the above composition. The invention has no special requirements on the types and sources of the various raw materials, as long as they meet the required ingredients of the steel ingots. According to the invention, smelting is carried out so that the oxygen content in the bearing steel is not higher than 20 ppm and the size of large granular inclusions (DS) is ≤40 microns.

According to the invention, after the steel ingots are obtained, they are homogenized and then processed into bars.

According to the invention, the temperature for homogenization is preferably about 1100~1250° C., and more preferably about 1150~1200° C.; the holding time is preferably about 2~6 hours, and more preferably about 3~5 hours. Upon the completion of homogenization, the resulting billet is processed into bars. According to the invention, the processing is preferably hot forging or hot rolling, and the temperature for hot forging or hot rolling is preferably about 1150~1200° C. The invention has no special requirement on the size of the bars, as long as it is set according to the requirements on the bearing steel. In the examples of the invention, the size of the bars is 160 mm. According to the invention, the processed bars are preferably cooled in air to room temperature, and then subject to the subsequent steps.

According to the invention, after the bars are obtained, they are spheroidizing annealed to obtain the annealed bars.

According to the invention, the process of spheroidizing annealing preferably comprises the steps of holding the bars are at about 800~860° C. for 0.5~12 hours, then cooling down to about 680~740° C. and holding for 0.5~12 hours, and finally cooling in the air to room temperature. According to the invention, spheroidizing annealing is carried out to get uniform fine carbides.

According to the invention, after the annealed bars are obtained, they are quenched to obtain quenched bars. According to the invention, the temperature for quenching is preferably about 820~860° C., and more preferably 840° C., the holding time is preferably 0.1~1.0 hours, and more preferably 0.5 hours; the cooling for quenching is preferably oil quenching. The invention has no special requirement on the process of oil quenching, and any oil quenching well known in the art may be used.

According to the invention, after the quenched bars are obtained, they are tempered to get the high-carbon bearing steel. According to the invention, the temperature for tempering is preferably about 130~200° C., and more preferably 170° C., the holding time is preferably 0.5~3.5 hours, and more preferably 3 hours; the cooling for tempering is preferably air cooling. Quenching and tempering are employed in the invention so as to get ultrafine original austenite and carbide particles, wherein the grain size of the original austenite is not less than grade 10.

The high-carbon bearing steel of the invention and the preparation method thereof will be illustrated in detail below in combination with the following examples, which are not construed as a limitation on the protection scope of the invention.

Example 1

The steel of the invention is smelted in a laboratory vacuum induction melting furnace, and casted into round ingots of 50 kg. 10 furnaces of steel are totally smelted for forging into rod-like samples, with the chemical ingredients shown in Table 1. MA1-MA10 steel are the microalloying bearing steel of the invention; and C1-C3 are the bearing steel used as the control (wherein the preparation method of round ingots is: C1 is GCr15 smelted in a laboratory vacuum induction melting furnace, C2 is GCr15 refined out of the furnace, and C3 is double vacuum GCr15).

GCr15 round ingots smelted in a laboratory vacuum induction melting furnace are homogenized at a high temperature of 1200° C. for 5 hours for the subsequent forging-cogging. The initial forging temperature is 1150° C., the initial section size is 120 mm casting blank, which is radially forged into round bars with a section size of 60 mm, and then cooled in air. The round bars with a diameter of 60 mm are spheroidizing annealed (held at 820° C. for 6 hours, then cooled down to 720° C. and held for 6 hours, and finally cooled in air to room temperature), and then quenched (held at 840° C. for 0.5 hours, followed by oil quenching) and tempered at low temperature (held at 170° C. for 3 hours, followed by air cooling) to get the high-carbon bearing steel.

MA1-MA10 and C1-C3 were tested for their mechanical properties, impact toughness and contact fatigue life (Tensile test: the tensile rate is $10^{-4}$/s, and the elongation adopts A5; Impact test: the size for impacting samples is U-shaped impact of 10 mm×10 mm×55 mm; Contact fatigue test: a thrust plate test with a maximum Hertz stress of 4.5 GPa), with the results shown in Table 2.

TABLE 1

Chemical compositions of steel of the invention and traditional steel ( wt %)

| | | C | Cr | Si | Mn | S | P | Mo | Nb | V |
|---|---|---|---|---|---|---|---|---|---|---|
| Steel of the invention | MA1 | 0.80 | 0.4 | 0.75 | 0.75 | 0.010 | 0.010 | — | — | 0.05 |
| | MA2 | 0.91 | 0.8 | 0.58 | 0.64 | 0.010 | 0.015 | — | 0.05 | — |
| | MA3 | 0.95 | 1.42 | 0.55 | 0.60 | 0.010 | 0.015 | 0.05 | — | 0.15 |
| | MA4 | 0.95 | 1.41 | 0.30 | 0.35 | 0.010 | 0.015 | 0.02 | 0.08 | — |
| | MA5 | 1.00 | 1.52 | 0.30 | 0.30 | 0.005 | 0.010 | 0.10 | 0.10 | — |
| | MA6 | 1.01 | 1.52 | 0.30 | 0.35 | 0.005 | 0.010 | | 0.20 | |
| | MA7 | 1.02 | 1.48 | 0.25 | 0.25 | 0.005 | 0.005 | 0.05 | 0.20 | — |
| | MA8 | 1.12 | 1.80 | 0.30 | 0.35 | 0.004 | 0.010 | 0.10 | 0.15 | 0.05 |
| | MA9 | 1.20 | 2.00 | 0.15 | 0.15 | 0.010 | 0.015 | 0.20 | 0.05 | 0.10 |
| | MA10 | 1.20 | 1.51 | 0.36 | 0.29 | 0.005 | 0.010 | | | 0.09 |
| Comparative steel | C1 | 1.02 | 1.48 | 0.35 | 0.38 | 0.005 | 0.005 | — | — | — |
| | C2 | 1.00 | 1.41 | 0.30 | 0.35 | 0.005 | 0.010 | — | — | — |
| | C3 | 0.80 | 1.48 | 0.36 | 0.41 | 0.010 | 0.015 | — | — | — |

TABLE 2

Results of mechanical properties and fatigue performances of the steel of the invention and the comparative steel

| | | Rm (MPa) | A5 (%) | Aku (J) | $L_{10}$ ($10^7$ times) |
|---|---|---|---|---|---|
| Steel of the invention | MA1 | 2450 | 4.5 | 16.0 | ≥2.8 |
| | MA2 | 2520 | 4.3 | 13.0 | ≥2.1 |
| | MA3 | 2490 | 3.0 | 12.0 | ≥4.5 |
| | MA4 | 2510 | 3.9 | 11.0 | ≥6.5 |
| | MA5 | 2570 | 4.2 | 11.0 | ≥10 |
| | MA6 | 2590 | 5.0 | 12 | ≥4.7 |
| | MA7 | 2530 | 3.8 | 10.5 | ≥8.2 |
| | MA8 | 2510 | 3.3 | 10.0 | ≥10 |
| | MA9 | 2493 | 3.0 | 8.9 | ≥4.3 |
| | MA10 | 2430 | 2.0 | 8.5 | ≥2.7 |
| Comparative steel | C1 | 2230 | 1.5 | 7.0 | ≥0.7 |
| | C2 | 2380 | 1.5 | 4.8 | ≥1.0 |
| | C3 | 2460 | 2.0 | 5.6 | ≥4.5 |

As seen in Table 2, microalloying of Nb, V and Mo greatly enhances the tensile strength (Rm), the elongation (A5) and the impact toughness (Aku) of bearing steel. This is mainly attributable to the ultrafine matrix and the ultrafine size of carbides. As shown in FIG. 1, a large amount of carbides are finely and uniformly distributed in the high-carbon bearing steel, and the average size of carbides is 0.28 microns, which is finer than the carbides of traditional GCr15 by about 1 time. At the same time, due to the microstructure refinement and enhanced mechanical properties for the steel of the invention, the contact fatigue life $L_{10}$ of microalloying bearing steel is enhanced by 3~14 times compared to $L_{10}$ of laboratory smelted bearing steel without microalloying (C1). Meanwhile, compared to the contact fatigue life of industrialized out-of-furnace refined steel GCr15 (C2) and double vacuum GCr15 (C3), it is also enhanced significantly. For example, compared to out-of-furnace refined GCr15, the fatigue life is enhanced by 2~10 times; and compared to double vacuum GCr15, the fatigue life also reaches 0.5~2.2 times. At the same time, it can be found from the comparison between Table 1 and Table 2 that when the total quantity of the compound microalloying is in a range of 0.10~0.30%, the contact fatigue performance can be enhanced better. The characteristics of low cost and long life for the steel of the invention will greatly improve the service life and reliability of high-end equipment, thus having huge market application potentials in aerospace, mining machinery, transportation, marine ships, and other fields.

The foregoing is only preferable implementation of the invention. It should be noted to persons with ordinary skills in the art that several improvements and modifications can be made without deviating from the principle of the invention, which are also considered within the scope of the invention.

What is claimed is:

1. A high-carbon bearing steel, wherein the chemical composition consists of: C: 0.95-1.1 wt %, Cr: 0.40-1.8 wt %, Mn: 0.15-0.75 wt %, Si: 0.15-0.30 wt %, Nb: 0.08-0.20 wt %, Mo: 0.02-0.20 wt %, P≤0.015 wt %, S≤0.01 wt %, the remaining is Fe and unavoidable impurities; wherein a total content of Nb and Mo is 0.10-0.30 wt %, the high-carbon bearing steel has a tensile strength of 2510 MPa to 2590 MPa, and a contact fatigue life $L_{10}$ of not less than $6.5 \times 10^7$ times, and
   the high-carbon bearing steel is prepared by a method consisting of the steps of:
   smelting raw materials of the high-carbon bearing steel to obtain steel ingots, wherein the steel ingots have a chemical composition corresponding to the chemical composition of the high-carbon bearing steel,
   homogenizing the steel ingots and then processing them into bars; and
   successively spheroidizing annealing, quenching, and tempering the bars to obtain the high-carbon bearing steel,
   wherein a process of spheroidizing annealing comprises holding the bars at 800-860° C. for 0.5-12 hours, then cooling down to 680-740° C. and holding for 0.5-12 hours, and finally cooling in air to room temperature,
   a temperature for quenching is 820-860° C., a holding time is 0.10-1.0 hours, and a cooling for quenching is oil quenching, and
   a temperature for tempering is 130-200° C., a holding time is 0.5-3.5 hours, and a cooling for tempering is air cooling.

2. The high-carbon bearing steel according to claim 1, wherein the Cr is in an amount of 1.41-1.8 wt %.

3. A high-carbon bearing steel, wherein the chemical composition consists of: C: 0.95-1.1 wt %, Cr: 0.40-1.8 wt %, Mn: 0.15-0.75 wt %, Si: 0.15-0.30 wt %, Nb: 0.08-0.20 wt %, Mo: 0.02-0.20 wt %, P≤0.015 wt %, S≤0.01 wt %, the remaining is Fe and unavoidable impurities; wherein a total content of Nb and Mo is 0.10-0.30 wt %, the high-carbon bearing steel has a tensile strength of 2510 MPa to 2590 MPa, and a contact fatigue life $L_{10}$ of not less than $6.5 \times 10^7$ times.

4. The high-carbon bearing steel according to claim 3, wherein the Cr is in an amount of 1.41-1.8 wt %.

5. A method of making a high-carbon bearing steel wherein the high-carbon bearing steel consists of C: 0.95-1.1 wt %, Cr: 0.40-1.8 wt %, Mn: 0.15-0.75 wt %, Si: 0.15-0.30 wt %, Nb: 0.08-0.20 wt %, Mo: 0.02-0.20 wt %, P≤0.015 wt %, S≤0.01 wt %, the remaining is Fe and unavoidable impurities; wherein a total content of Nb and Mo is 0.10-0.30 wt %, consisting of the steps of:
   smelting raw materials of the high-carbon bearing steel to obtain steel ingots, wherein the steel ingots have a chemical composition corresponding to the chemical composition of the high-carbon bearing steel;
   homogenizing the steel ingots and then processing them into bars;
   successively spheroidizing annealing, quenching, and tempering the bars to obtain the high-carbon bearing steel,
   wherein a process of spheroidizing annealing comprises holding the bars at 800-860° C. for 0.5-12 hours, then cooling down to 680-740° C. and holding for 0.5-12 hours, and finally cooling in air to room temperature,
   a temperature for quenching is 820-860° C., a holding time is 0.10-1.0 hours, and a cooling for quenching is oil quenching, and
   a temperature for tempering is 130-200° C., a holding time is 0.5-3.5 hours, and a cooling for tempering is air cooling.

6. The method according to claim 5, wherein the smelting is electro-slag remelting (ESR), double vacuum melting (VIM+VAR), out-of-furnace refining or vacuum induction melting.

7. The method according to claim 5, wherein a temperature for homogenization is 1100-1250° C., and a holding time is 2-6 hours.

8. The method according to claim 5, wherein each bar is processed by hot forging or hot rolling, and a temperature for hot forging or hot rolling is 1150-1200° C.

* * * * *